(12) United States Patent
Hatayama

(10) Patent No.: US 6,219,657 B1
(45) Date of Patent: Apr. 17, 2001

(54) DEVICE AND METHOD FOR CREATION OF EMOTIONS

(75) Inventor: Akemi Hatayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/041,658

(22) Filed: Mar. 13, 1998

(30) Foreign Application Priority Data

Mar. 13, 1997 (JP) .................................... 9-078918

(51) Int. Cl.$^7$ .............................. G06F 15/18; G06E 1/00; G06E 3/00

(52) U.S. Cl. ................................ 706/14; 706/18; 706/20; 706/26

(58) Field of Search .................................. 706/14, 18, 26, 706/20

(56) References Cited

U.S. PATENT DOCUMENTS

| | | | |
|---|---|---|---|
| 5,497,430 | * 3/1996 | Sadovnik et al. | 382/156 |
| 5,724,484 | * 3/1998 | Kagami et al. | 706/50 |
| 5,774,591 | * 6/1998 | Black et al. | 382/236 |

FOREIGN PATENT DOCUMENTS

| | | |
|---|---|---|
| 7-72900 | 3/1995 | (JP) . |
| 7-104778 | 4/1995 | (JP) . |
| 8-339446 | 12/1996 | (JP) . |
| 10-49188 | 2/1998 | (JP) . |

OTHER PUBLICATIONS

Avent et al, "Machine Vision Recognition of Facial Affect Using Backpropagation Neural Networks", IEEE Proceedings of the 16th Annual International Conference on New Opportunities for Biomedical Engineers, Engineering in Medicine and Biology Society, Nov. 1994.*

Yamada et al, "Pattern Recognition of Emotion with Neural Network", IEEE International Conference on Industrial Electronics, Control and Instrumentation, Nov. 1995.*

Sato et al, "Emotion Modeling in Speech Production Using Emotion Space", IEEE 5th International Workshop on Robot and Human Communication, Nov. 1996.*

Pramadihanto et al, "Face Recognition from a Single View Based on Flexible Neural Network Matching", IEEE 5th International Workshop on Robot and Human Communication, Nov. 1996.*

Ding et al, "Neural Network Structures for Expression Recognition", Proceeding of IEEE 1993 International Conference on Neural Networks, 1993.*

(List continued on next page.)

Primary Examiner—George B. Davis
(74) Attorney, Agent, or Firm—Foley & Lardner

(57) ABSTRACT

A device and a method for creation of emotions are provided for an interface of information, such as an artificial agent and a personified agent, intervened between a human being (i.e., user) and an electronic apparatus. For instance, an emotion creating device is configured by a neural network, a behavior determination engine and a feature determination engine. The neural network inputs user information, representing conditions of the user, and apparatus information, representing conditions of the apparatus, so as to produce emotional states. Herein, a present set of emotional states are produced in consideration of a previous set of emotional states. The emotional states represent prescribed emotions such as pleasure, anger, sadness and surprise. The behavior determination engine refers to a behavior determination database using the user information and the emotional states of the neural network so as to determine a behavior of the interface. The feature determination engine refers to a database using the emotional states of the neural network to determine a feature of the interface, which corresponds to a facial feature.

11 Claims, 11 Drawing Sheets

OTHER PUBLICATIONS

Takacs et al, "Locating Facial Features Using SOFM", IEEE Proceedings of the 12th IAPR International Conference on Pattern Recognition, Oct. 1994.*

Vincent et al, "Precise Location of Facial Features by a Hierarchical Assembly of Neural Nets", IEEE 2nd International Conference of Artificial Neural Networks, 1991.*

Morishima et al, "Emotion Space for Analysis and Synthesis of Facial Expression", IEEE International Workshop on Robot and Human Communication, 1993.*

Kawakami et al, "Construction of 3–D Emotion Space Based on Parameterized Faces", IEEE International Workshop on Robot and Human Communication, 1994.*

Kawakami et al, "An Evaluation of 3–D Emotion Space" IEEE International Workshop on Robot and Human Communication, 1995.*

Morishima et al, "A Facial Image Synthesis System for Human–Machine Interface", IEEE International Workshop on Robot and Human Communication, 1992.*

Morishima et al, "Image Synthesis and Editing System for a Multi–Media Human Interface with Speaking Head" IEEE Inter. Conf. on Image Processing and Its Applications, 1992.*

Morishima et al, "A Media Conversion from Speech to Facial Image for Intelligent Man–Machine Interface", IEEE Journal on Selected Areas in Communications, 1991.*

* cited by examiner

FIG.3

| | S0 | S1 | S2 | S3 | I0 (TIMES/min) | I1 (dB) | I2 (s) | I3 (TIMES/min) | I4 (gf) | I5 (s/1TIME) | I6 (°C) | I7 (min) | T0 | T1 | T2 | T3 |
|---|---|---|---|---|---|---|---|---|---|---|---|---|---|---|---|---|
| 0 | 0 | 0 | 0 | 0 | 10 | 50 | 2 | 80 | 40 | 2 | 30 | 60 | 0.5 | 0 | 0 | 0 |
| 1 | 0 | 0 | 0 | 0 | 20 | 80 | 2 | 110 | 100 | 5 | 100 | 240 | 0 | 0.5 | 0 | 0 |
| 2 | 0 | 0 | 0 | 0 | 10 | 50 | 600 | 80 | 50 | 2 | 30 | 60 | 0 | 0 | 0.5 | 0 |
| 3 | 0 | 0 | 0 | 0 | 10 | 50 | 2 | 110 | 40 | 2 | 30 | 60 | 0 | 0 | 0 | 0.5 |
| 4 | 0.5 | 0 | 0 | 0 | 10 | 50 | 2 | 80 | 40 | 2 | 30 | 60 | 1.0 | 0 | 0 | 0 |
| 5 | 0 | 0.5 | 0 | 0 | 20 | 80 | 2 | 110 | 100 | 5 | 100 | 240 | 0 | 1.0 | 0 | 0 |
| 6 | 0 | 0 | 0.5 | 0 | 10 | 50 | 600 | 80 | 50 | 2 | 30 | 60 | 0 | 0 | 1.0 | 0 |
| 7 | 0 | 0 | 0 | 0.5 | 10 | 50 | 2 | 110 | 40 | 2 | 30 | 60 | 0 | 0 | 0 | 1.0 |

| $D_0$ | $D_1$ | $D_2$ | $D_3$ | DATA |
|---|---|---|---|---|
| 0 | 0 | 0 | 0 | DATA 0 |
| 0 | 0.5 | 0 | 0 | DATA 1 |
| 1 | 0 | 0 | 0 | DATA 2 |
| ⋮ | | | | |
| 1 | 1 | 1 | 1 | DATA 81 |

DEVICE AND METHOD FOR CREATION OF EMOTIONS

BACKGROUND OF THE INVENTION

1. Field of the Invention

This invention relates to devices and methods for creation of motions in electronic apparatuses containing interfaces such as the artificial life and artificial agent. This application is based on patent application No. Hei 9-78918 filed in Japan, the content of which is incorporated herein by reference.

2. Prior Art

Recently, electronic apparatuses such as the home electronic apparatuses and office automation apparatuses are designed to have multi functions and complicated configurations. As for the electronic apparatus which is designed to have multi functions, the recent technology realizes a human interface which is capable of increasing an efficiency to handle the apparatus. For example, the recent technology provides the bar code input system and voice input/output system. Conventionally, complicated manual operations are required to input instructions to the apparatus. Those manual operations are replaced by simple button operations. Combinations of the simple button operations are replaced by "collective" bar code inputs. Then, the advanced apparatus is capable of accepting the voice instructions using the natural language which the user is familiar with. Progresses are made on responses from the apparatuses. Previously, the apparatus merely executes the instructions. Nowadays, the apparatus is capable of sending a response showing acceptance of the instruction(s). In the case of the reservation of videotape recording on the videotape recorder, for example, when the user accomplishes the reservation of videotape recording, the videotape recorder automatically indicates a videotape recording reservation mark on a certain section relating to a timer display of a video display screen thereof. At completion of the reservation, a television set connected to the videotape recorder visually displays a string of symbols (or characters) or natural language for declaring acceptance of the reservation on a screen thereof. In addition, the natural language is vocalized so that a speaker of the television set produces human voices representing a short sentence as follows:

"Reservation is completed (or accepted)".

Nowadays, the technology is developed to gradually actualize a simplified interface whose operation is simplified as described above. Now, engineers tend to pay an attention to the method to simulate the operation of the interface as if a personified agent performs the operation. Such personification will make the user to increase his or her expectation to the interface. However, too much increased expectation may cause dissatisfaction of the user against the present level of the interface which the user may not please so much. To eliminate such dissatisfaction of the user against the interface, the paper of Japanese Patent Laid-Open Publication No. 6-12401 provides a new technology which tries to bring (simulated) emotions in the personified agent.

According to the conventional personified agent described above, the emotions are realized by changing one parameter with respect to a single situation or by changing multiple parameters independently with respect to a single situation. For this reason, if the effects given from the external are unchanged, an amount of variations of the emotions should be directly (or univocally) determined, regardless of the present emotional situation. So, as compared with the "actual" biological variations of the emotions, the personified agent is subjected to "unnatural" variations of the emotions.

In addition, the conventional personified agent is designed to accept only the pre-defined situations given from the external. So, the conventional personified agent does not change emotions in response to the non-defined situation(s). For this reason, the conventional personified agent lacks diversity in variations of the emotions.

Another method is provided to control the personified agent using random numbers for variations of the emotions. However, such a method may produce emotions whose variations are unnatural (or strange).

SUMMARY OF THE INVENTION

It is an object of the invention to provide a device and a method for creation of emotions, which are capable of creating emotions whose variations are natural and biological.

A device and a method for creation of emotions according to this invention are provided for an interface of information, such as an artificial agent and a personified agent, intervened between a human being (i.e., user) and an electronic apparatus.

According to one aspect of the invention, an emotion creating device is configured by a neural network, a behavior determination engine and a feature determination engine. The neural network inputs user information, representing conditions of the user, and apparatus information, representing conditions of the apparatus, so as to produce emotional states. Herein, a present set of emotional states are produced in consideration of a previous set of emotional states. The emotional states represent prescribed emotions such as pleasure, anger, sadness and surprise. The behavior determination engine refers to a behavior determination database using the user information and the emotional states of the neural network so as to determine a behavior of the interface. The feature determination engine refers to a database using the emotional states of the neural network to determine a feature of the interface, which corresponds to a facial feature.

According to another aspect of the invention, an emotion creating method is actualized using programs which are run by a computer to realize functions of the emotion creating device. Herein, the programs and data are stored in a recording media.

BRIEF DESCRIPTION OF THE DRAWINGS

These and other objects of the subject invention will become more fully apparent as the following description is read in light of the attached drawings wherein:

FIG. 3 shows an example of data used for the learning of the neural network;

DESCRIPTION OF THE PREFERRED EMBODIMENT

Figure 1:
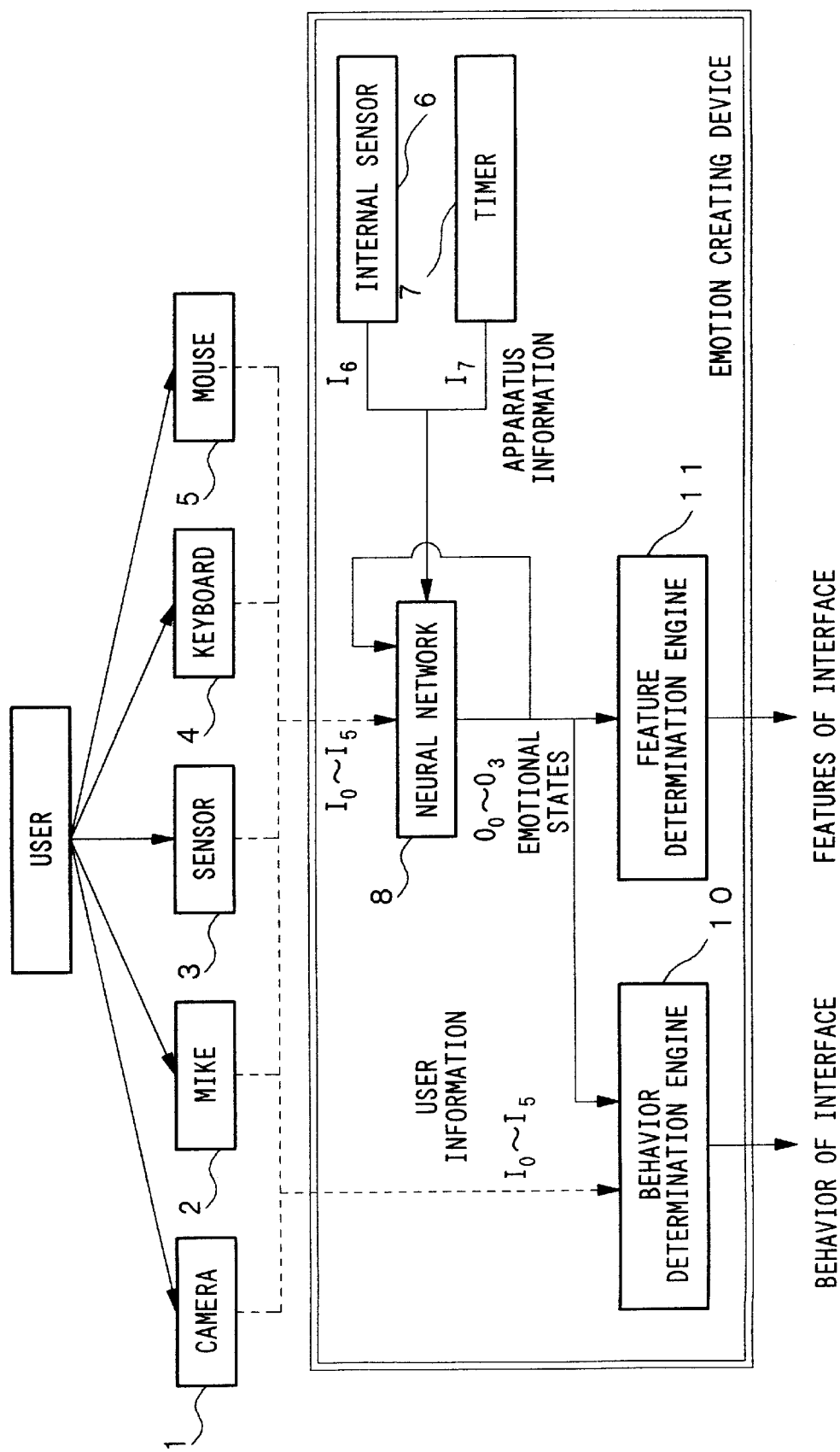
FIG. 1 is a block diagram showing a configuration of an emotion creating device in accordance with an example of the embodiment of the invention.

FIG. 1 is a block diagram showing an example of a configuration of an emotion creating device in accordance with the preferred embodiment of the invention. Herein, the emotion creating device of the present example is mainly configured by a neural network 8, a behavior determination engine 10 and a feature determination engine 11.

The configuration shown in FIG. 1 is designed in consideration of the situation where the emotion creating device is connected to a personal computer. As inputs of data from a user to the emotion creating device, there are provided a camera 1, a microphone (or mike) 2, a sensor 3, a keyboard 4 and a mouse 5. Herein, the camera 1, the mike 2 and the sensor 3 are provided to obtain analog-variation-type information of the user (hereinafter, simply referred to as analog variation information). Concretely speaking, the analog variation information corresponds to the gaze and look picked up by the camera 1, the skin temperature and pulse rate sensed by the sensor 3 as well as the voice and other sound(s) picked up by the mike 2. In addition, information which is variable with stream (hereinafter, simply referred to as streaming information) is defined by programs. The streaming information corresponds to the shout voice and tut of the user against the mistake of the interface as well as the user's response against the output of the apparatus and histroy of the user's response. Two kinds of the information described above are transmitted to the emotion creating device by using any of the camera 1, the mike 2, the keyboard 4 and the mouse 5. Hereinafter, the analog variation information and streaming information are given a general term of "user information". On the other hand, time-series information which is variable in the apparatus (hereinafter, simply referred to as apparatus information) corresponds to an apparatus temperature $I_6$ detected by an internal sensor 6 and a using time $I_7$ to use the personal computer, which is measured by a timer 7.

Figure 2:
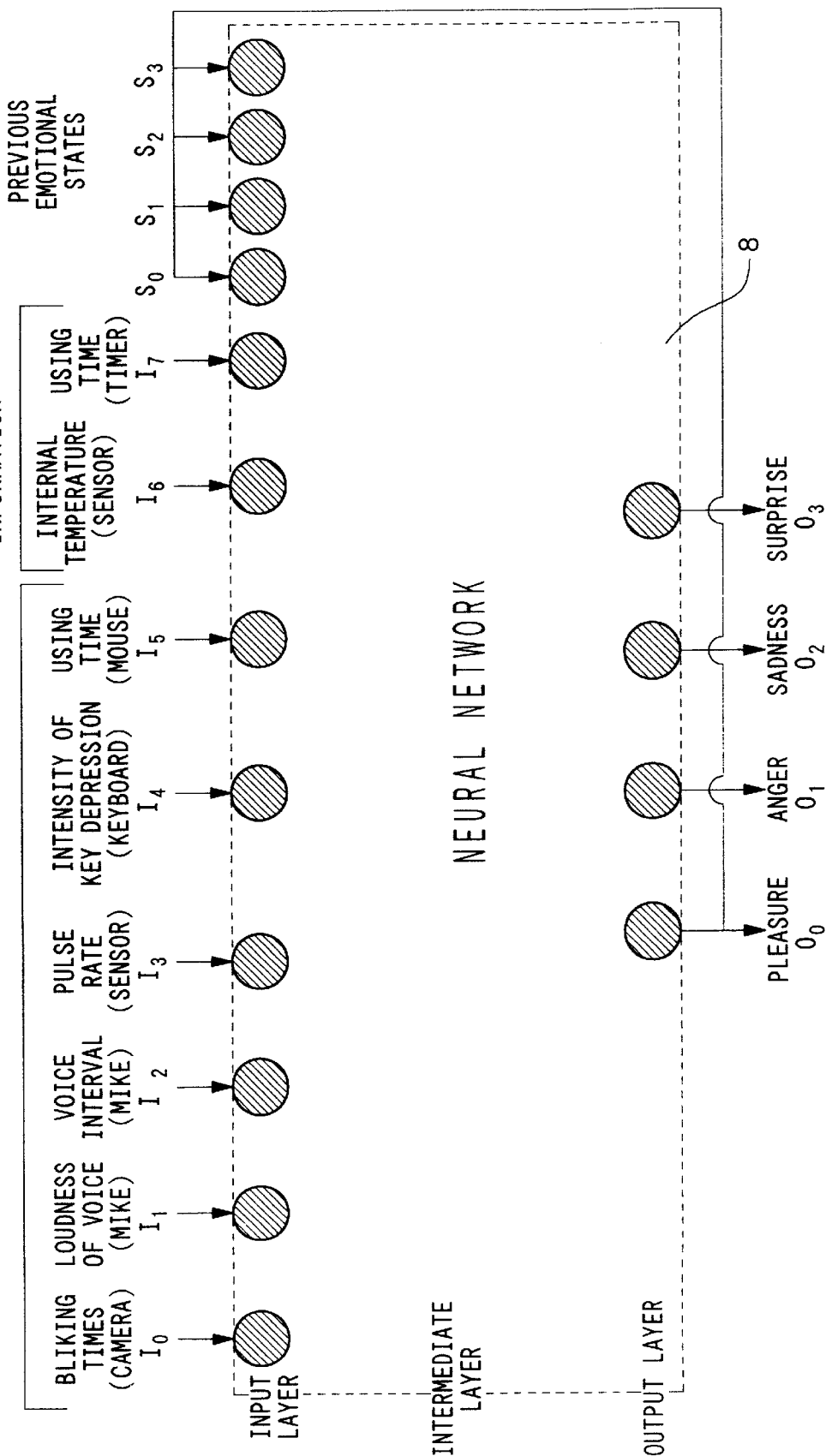
FIG. 2 shows an internal configuration of a neural network containing an input layer, an intermediate layer and an output layer.

FIG. 2 shows the details of the neural network 8, which is configured by three layers, i.e., an input layer, an intermediate layer and an output layer. As pieces of the user information input to the neural network 8, there are provided "a number of times of blinking" $I_0$ detected by the camera 1, "loudness of voice" $I_1$ and "voice interval" $I_2$ both detected by the mike 2, "pulse rate" $I_3$ detected by the sensor 3, "intensity of key depression" $I_4$ obtained from the keyboard 4 and "using time" $I_5$ to use the personal computer one time, which is obtained from the mouse 5. As pieces of the apparatus information, there are provided "internal temperature" $I_6$ detected by the internal sensor 6 and "using time" $I_7$ measured by the timer 7. Outputs $O_0$ to $O_3$ produced on the output layer of the neural network 8 correspond to data representing emotional states. In other words, the four outputs $O_0$, $O_1$, $O_2$ and $O_3$ respectively correspond to emotions of "pleasure", "anger", "sadness" and "surprise". Incidentally, the outputs $O_0$ to $O_3$ are called emotional states. Further, previously outputted emotional states $O_0$ to $O_3$ are input to the neural network 8 as present emotional states $S_0$ to $S_3$.

FIG. 3 shows examples of learning data, which are required for the learning of the neural network 8, such as the user information $I_0$ to $I_5$, the apparatus information $I_6$, $I_7$ and teacher signals $T_0$ to $T_3$. The neural network 8 is subjected to learning using the back propagation method and the like. The back propagation method is one kind of learning accompanied with a teacher. According to this method, there is provided a set of data (simply referred to as an input set) representing an input and its appropriate answer (i.e., teacher), so the learning is performed using the set of data. Suppose a situation where the user uses the apparatus for a long time so that the user and the apparatus are both tired. When an input representing such a situation is applied to the neural network 8, the neural network 8 firstly produces emotional states $O_0$ to $O_3$ representing a high possibility that the inappropriateness is caused. In that case, it is necessary that the neural network 8 learns to respond to the above situation with ideal emotional states $O_0$ to $O_3$ which show an emotion of "rage". In order to do so, teacher signals $T_0$ to $T_3$ representing "rage" are applied to the neural network 8. As described above, the learning of the neural network 8 is performed by repeating application of the teacher signals $T_0$ to $T_3$ with respect to several kinds of inputs. After completion of the learning, the neural network 8 is capable of producing "appropriate" emotional states $O_0$ to $O_3$, which complements the given input sets, with respect to information which is not directly input to the neural network 8 as the input set(s). If the neural network 8 is not taught the emotion of "anger", it is possible to construct emotional property of never being caught in the emotion of "anger". By the way, the actual emotions have continuity and directionality. In addition, the actual biological form has emotions which contain an emotion of strong response and an emotion of not so strong response. For example, it is easily caught in the emotion of "anger" but is not easily caught in the emotion of "pleasure". That is, using the characteristics of the neural network 8, it is possible to express more biological emotions. Incidentally, more detailed explanation of the learning of the neural network is described in a book entitled "Neurocomputer" published by "Gijutsuhyouronsya" of Japan.

The emotional states $O_0$ to $O_3$ of the neural network 8 are passed to the behavior determination engine 10 and the feature determination engine 11. They are used as one element of determination for determining a behavior such as a response from the apparatus against an inquiry from the user. Or, they are used to produce features such as expression and color of the personified interface.

Figure 4:
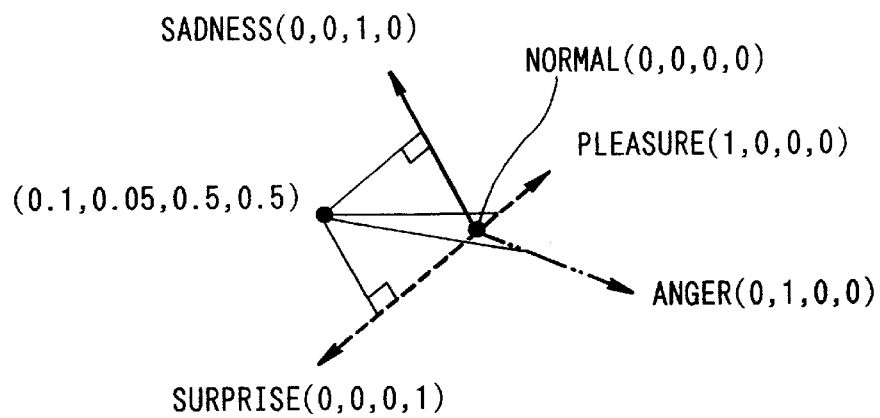
FIG. 4 shows an example of an emotion map which is formed in response to emotional states of the neural network.

FIG. 4 shows an example of a virtual four-dimensional space (hereinafter, referred to as an emotion map) which is formed by the emotional states $O_0$ to $O_3$. The emotion map is formed by four dimensions corresponding to the emotional outputs $O_0$ to $O_3$ representing the pleasure, anger, sadness and surprise respectively. Each of the emotional outputs $O_0$ to $O_3$ is variable within a range between (0, 0, 0, 0) and (1, 1, 1, 1). Herein, the characteristic of the emotional output becomes more intense as the value of the emotional output becomes larger. The intensity of the characteristic of the emotional output is represented by a location on the line connecting between (0, 0, 0, 0) and (1, 1, 1, 1). Herein, if all the values of the emotional outputs $O_0$ to $O_3$ are equal to each other, it can be said that emotions are placed in a neutral and stable state.

Figure 5:
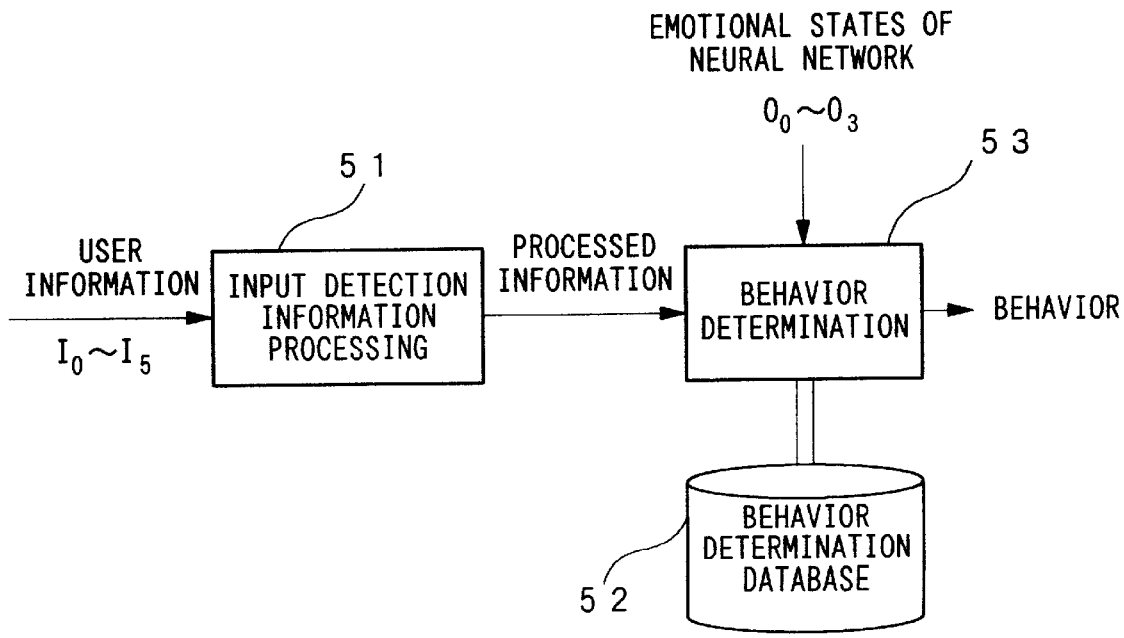
FIG. 5 is a block diagram showing an internal structure of a behavior determination engine provided inside of the emotion creating device of FIG. 1.

FIG. 5 is a block diagram showing an example of an internal structure of the behavior determination engine 10. The behavior determination engine 10 is mainly configured by an input detection information processing block 51, a behavior determination database 52 and a behavior determination block 53.

The input detection information processing block 51 analyzes user information $I_0$ to $I_5$ given from the external. Herein, the block 51 changes over processing elements in response to the user information so as to process the user information. That is, the block 51 uses a picture recognizer for processing of pictures while using a voice recognizer for processing of voices. Incidentally, the information processed by the block 51 is called processed information.

Figure 6:
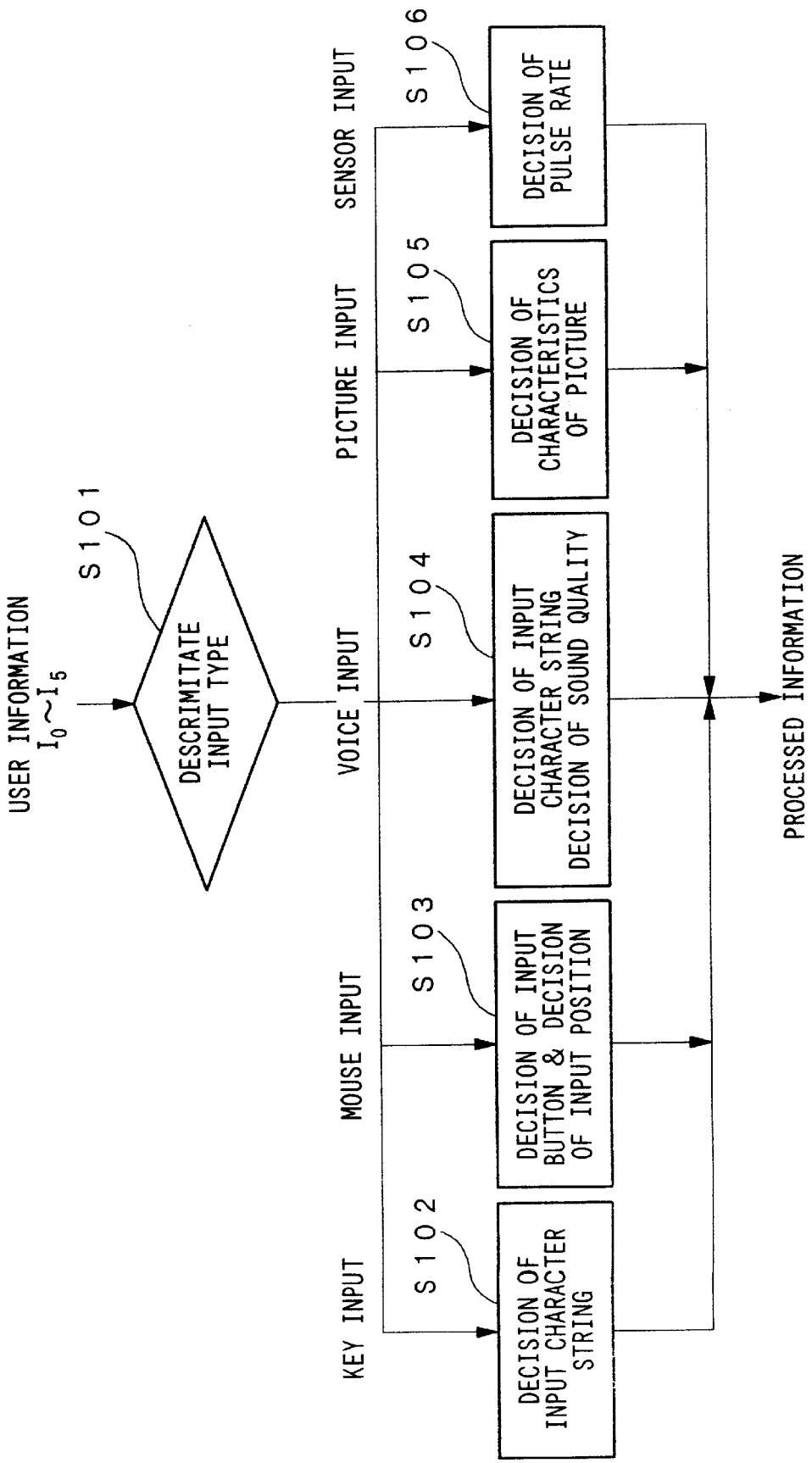
FIG. 6 is a flowchart showing content of processing of an input detection information processing block shown in FIG. 5.

Processing of the input detection information processing block 51 is performed in accordance with steps shown in FIG. 6. It is constructed by an input type discrimination step S101, an input character string decision step S102, an input button decision and input location decision step S103, an input character string decision and sound quality decision step S104, a picture characteristic decision step S105 and a pulse rate decision step S106.

Figure 7:
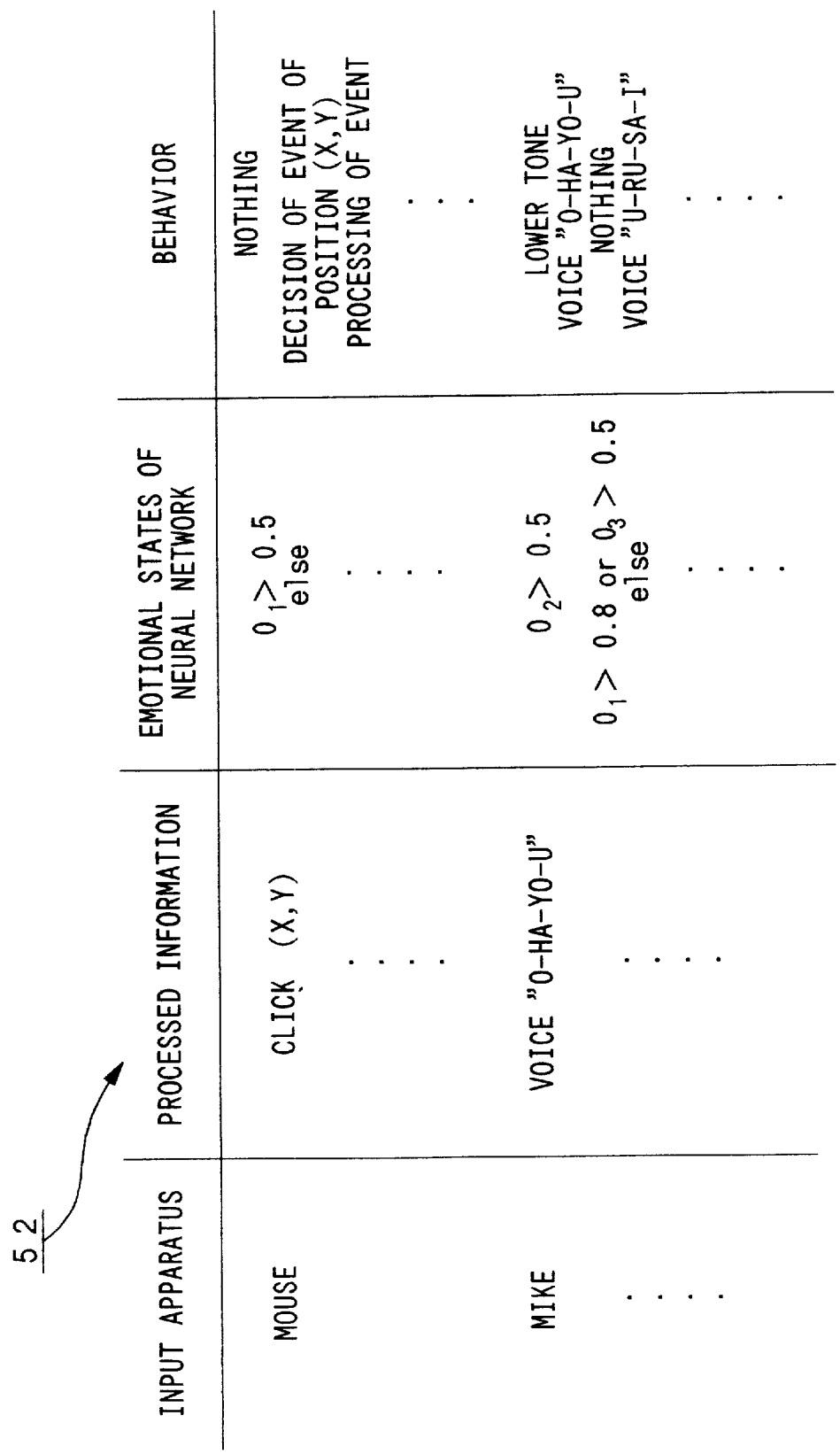
FIG. 7 shows an example of content of a behavior determination database shown in FIG. 5.

FIG. 7 shows an example of a part of content of the behavior determination database 52. The behavior determination database 52 describes behaviors of the interface in connection with the processed information input thereto and the emotional states $O_0$ to $O_3$ of the neural network 8.

Using the processed information given from the input detection information processing block 51 and the emotional states $O_0$ to $O_3$ of the neural network 8, the behavior determination block 53 performs searching on the behavior determination database 52 to determine the behavior of the interface.

Figure 8:
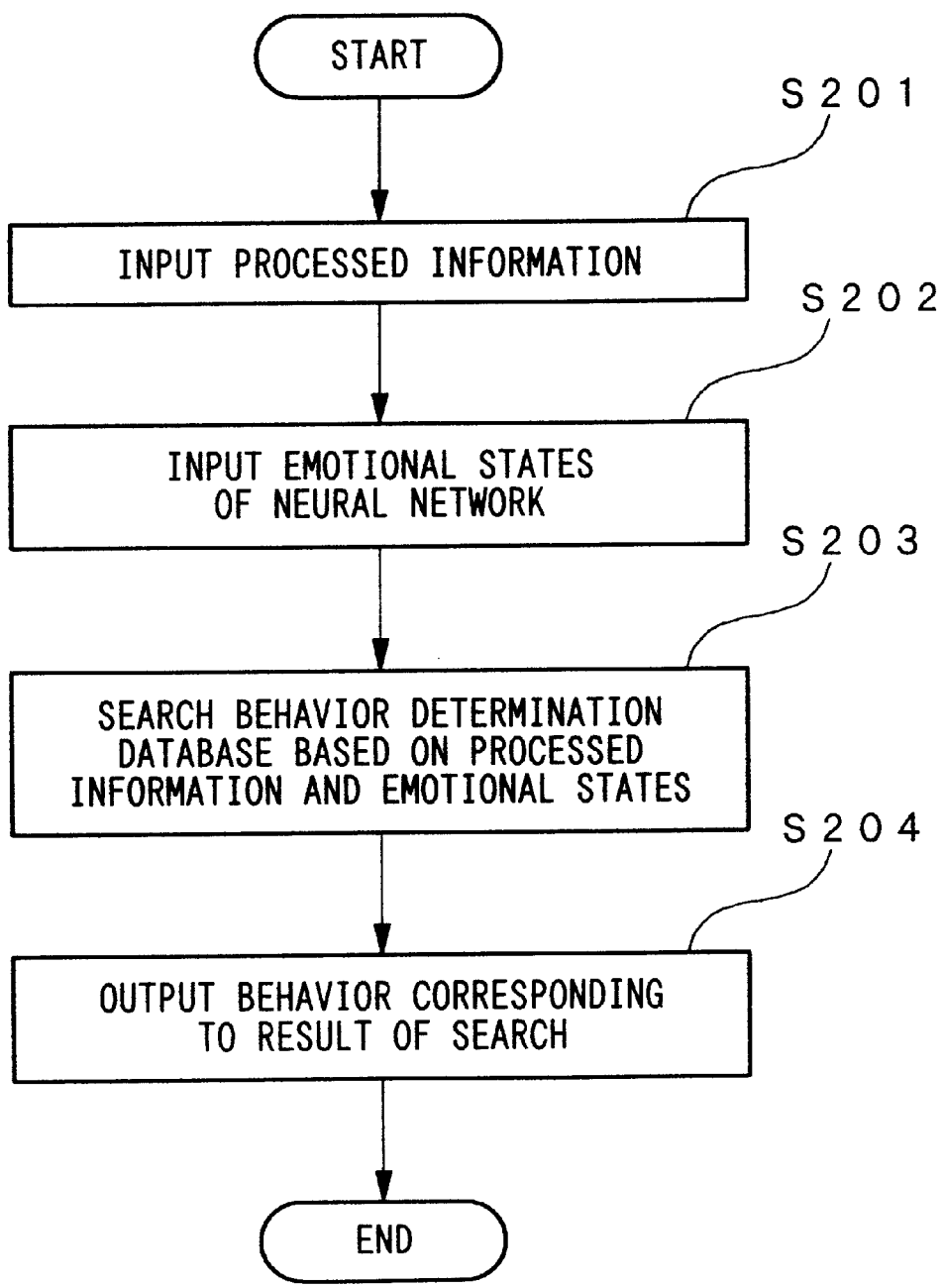
FIG. 8 is a flowchart showing content of processing of a behavior determination block shown in FIG. 5.

The processing of the behavior determination block 53 is performed in accordance with steps shown in FIG. 8. It is constructed by a processed information input step S201, a neural network emotional state input step S202, a behavior determination database search step S203 and a behavior output step S204.

Figure 9:
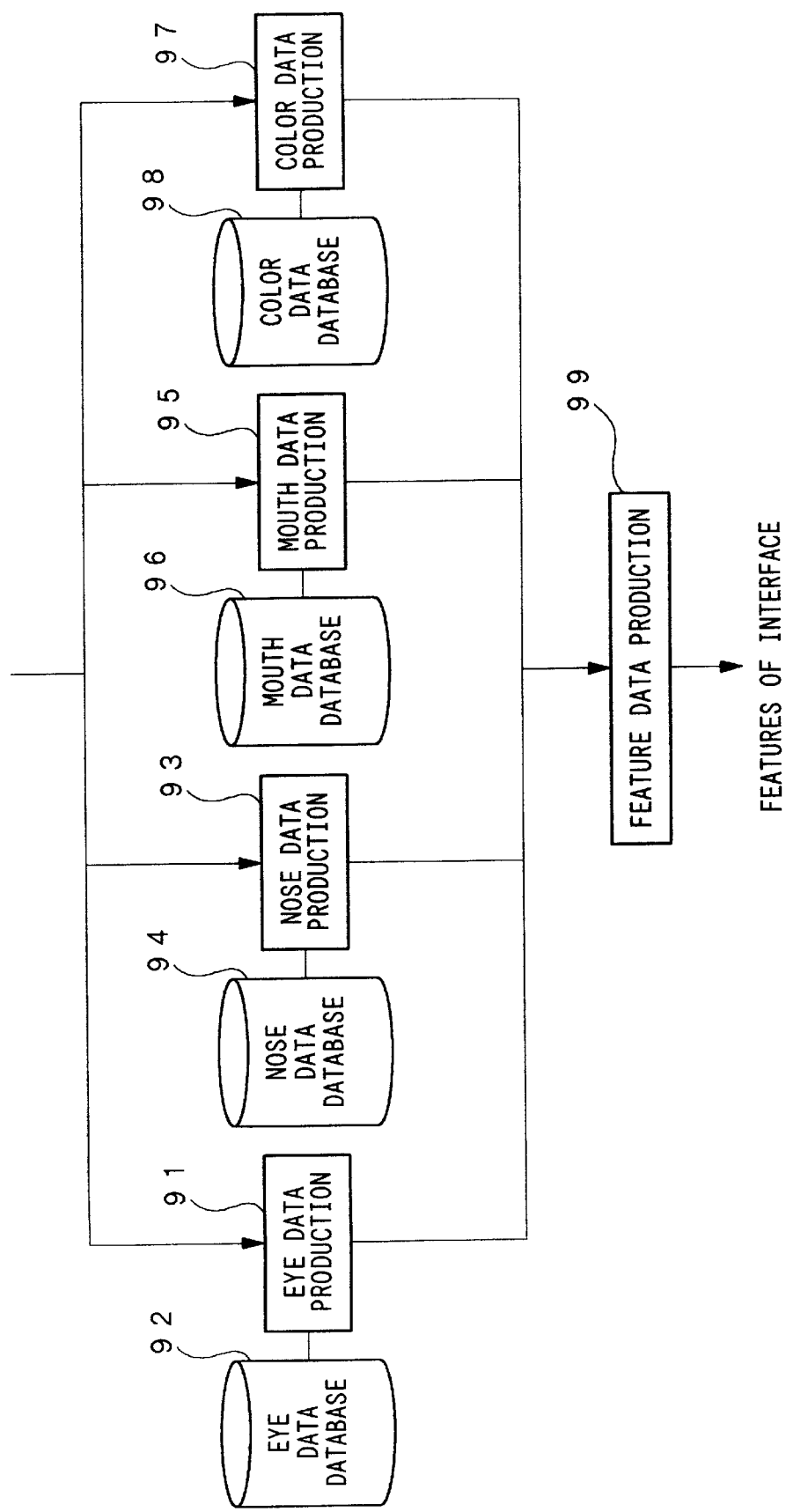
FIG. 9 is a block diagram showing an outline of a feature determination engine provided inside of the emotion creating device of FIG. 1.

FIG. 9 is a block diagram showing an outline of the feature determination engine 11. Herein, the feature determination engine 11 is configured by an eye data production section 91, an eye data database 92, a nose data production section 93, a nose data database 94, a mouth data production section 95, a mouth data database 96, a color data production section 97, a color data database 98 and a feature data production section 99.

Creation of data for the features is performed with respect to parts such as eyes, nose, mouth and color. Each part has its own database. Based on the emotional states $O_0$ to $O_3$, the emotion creating device uses the eye data database 92, the nose data database 94, the mouth data database 96 and the color data database 98 to produce eye data, nose data, mouth data and color data which are suited to the emotional states $O_0$ to $O_3$. Based on those data, the device produces data used for formation of features, such as picture data.

Figures 10, 11:
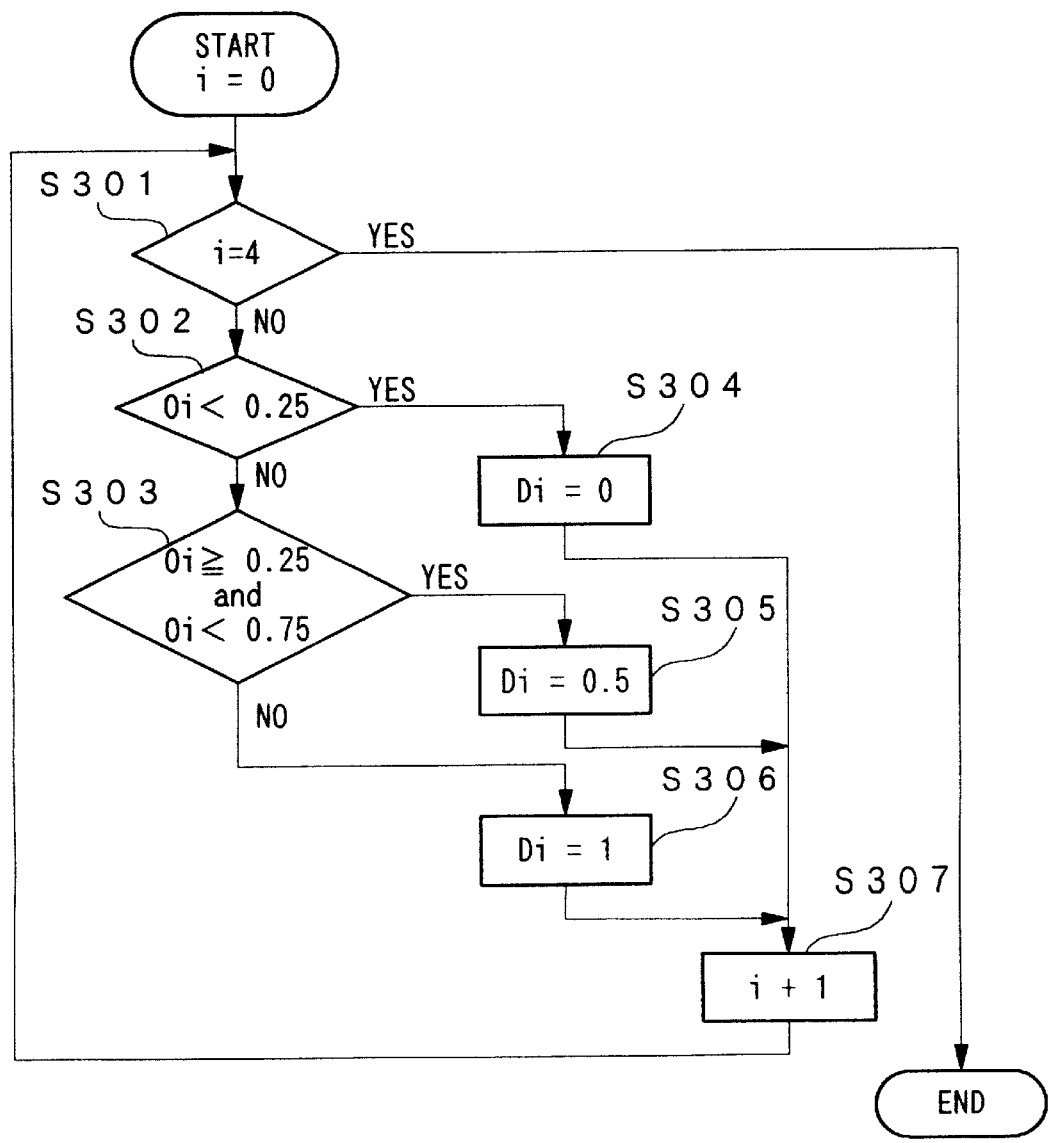
FIG. 10 shows an example of a data storage format for storing data in a database shown in FIG. 9.
FIG. 11 is a flowchart showing a method to produce an emotion value from emotional states in FIG. 9.

FIG. 10 shows an example of a data storage format used for the eye data database 92, the nose data database 94, the mouth data database 96 and the color data database 98. Like the emotional states $O_0$ to $O_3$, emotion values denoted by a symbol $D_i$ (where i=0 to 3) correspond to the emotions of "pleasure", "anger", "sadness" and "surprise". Herein, the emotion value $D_i$ is set at any one of three values, i.e., "0", "0.5" and "1". At completion of the emotion value $D_i$, formation data used for formation of each part is determined. The formation data correspond to picture data such as bit map data and polygon data. When all the formation data are completely produced for all parts, the feature data production section 99 integrates them to produce integrated picture data for representation of the features.

FIG. 11 is a flowchart whose processing is applied to each of the eye data production section 91, the nose data production section 93, the mouth data production section 95 and the color data production section 97, wherein it shows a method to produce the emotion value $D_i$ (where i=0 to 3) from the emotional state $O_i$ (where i=0 to 3) output from the neural network 8. Concretely speaking, the method to produce Di from the emotional state $O_i$ is the method that compares an output $O_i$ of the neural network 8 with emotion values $D_i$ stored in each of the eye data database 92, the nose data database 94, the mouth data database 96 and the color data database 98 to select an emotion value $D_i$ which is the closest to $O_i$.

The method of FIG. 11 to produce the emotion value $D_i$ (where i=0 to 3) is constructed by steps S301 to S307, as follows:

S301: a decision as to whether i=4;
S302: a decision as to whether the emotional state $O_i$ is less than 0.25;
S303: a decision as to whether the emotional state $O_i$ is 0.25 or more and is less than 0.75;
S304: the emotion value $D_i$ is set at 0;
S305: the emotion value $D_i$ is set at 0.5;
S306: the emotion value $D_i$ is set at 1; and
S307: increase a counter i.

Next, a description will be given with respect to the operation of the emotion creating device, which is configured in accordance with the embodiment of the invention, together with the emotion creating method.

The emotion creating device inputs pieces of user information $I_0$ to $I_5$ which correspond to analog variation information given from the camera 1, the mike 2 and the sensor 3 as well as streaming information given from the keyboard 4 and the mouse 5. In addition, the emotion creating device inputs pieces of apparatus information $I_6$ and $I_7$ given from the internal sensor 6 and the timer 7. In addition to the above pieces of information, the neural network 8 inputs previous emotional states $S_0$ to $S_3$ so as to output present emotional states $O_0$ to $O_3$.

The behavior determination engine 10 inputs the user information $I_0$ to $I_5$ and the emotional states $O_0$ to $O_3$ output from the neural network 8, thus determining the behavior of the interface.

Specifically, the behavior determination engine 10 operates in accordance with the aforementioned steps S101 to S106 shown in FIG. 6. That is, the input detection information processing block 51 inputs the user information $I_0$ to $I_5$ to discriminate an input type in step S101. If the input type corresponds to a key input, the block 51 makes a decision with respect to an input character string in step S102. If the input type corresponds to a mouse input, the block 51 makes a decision with respect to an input button and an input position in step S103. If the input type corresponds to a voice input, the block 51 makes a decision with respect to an input character string and sound quality in step S104. If the input type corresponds to a picture input, the block 51 makes a decision with respect to picture characteristics in step S105. If the input type corresponds to a sensor input, the block 51 makes a decision with respect to a pulse rate in step S106. Based on results of the decision, the input detection information processing block 51 outputs processed information.

Next, the behavior determination block 53 inputs the processed information output from the input detection information processing block 51 and the emotional states $O_0$ to $O_3$ output from the neural network 8. Using those inputs, the behavior determination block 53 performs searching on the behavior determination database 52 so as to determine the behavior of the interface.

FIG. 7 shows an example of the content of the behavior determination database 52. When the user information $I_4$ representing a click of the mouse 5 is input to the behavior determination engine 10, the behavior determination block 53 determines to do nothing in a case where the emotional state $O_1$ output from the neural network 8 is greater than 0.5. In other cases, the behavior determination block 53 makes a decision on an event of a position (x, y), so that the event is processed. When the user information $I_1$ representing a voice input of the mike 2 is input to the behavior determination engine 10, the behavior determination block 53 lowers a tone (or pitch) to output voices for pronouncing a Japanese word of "O-HA-YO-U" (i.e., "Good Morning" in English) in a case where the emotional state $O_2$ is greater than 0.5. In another case where the emotional state $O_1$ is greater than 0.8 or the emotional state $O_3$ is greater than 0.5, the behavior determination block 53 determines to do nothing. In other cases, the behavior determination block 53 outputs voices for pronouncing a Japanese word of "U-RU-SA-I" (i.e., "Shut Up" in English).

The feature determination engine 11 inputs the emotional states $O_0$ to $O_3$ of the neural network 8 to determine features of the interface.

Specifically, the eye data production section 91 performs searching on the eye data database 92 to determine eye data; the nose data production section 93 performs searching on the nose data database 94 to determine nose data; the mouth data production section 95 performs searching on the mouth data database 96 to determine mouth data; the color data production section 97 performs searching on the color data database 98 to determine color data. Then, the feature data production section 99 convolutes those data to provide features of the interface.

In the above, each of the eye data production section 91, the nose data production section 93, the mouth data production section 95 and the color data production section 97 produces the emotion value $D_i$ (where i=0 to 3) from the emotional state $O_i$ (where i=0 to 3). That is, if the emotional state $O_i$ is less than 0.25 (see step S302), the emotion value $D_i$ is set at 0. If the emotional state $O_i$ lies between 0.25 and 0.75 (see step S303), the emotion value $D_i$ is set at 0.5. If the emotional state $O_i$ is greater than 0.75, the emotion value $D_i$ is set at 1. Thus, normalization is performed using the emotion value $D_i$ described above. That is, the emotional state $O_i$ of the neural network 8 is compared with the emotion value $D_i$ stored in the eye data database 92, the nose data database 94, the mouth data database 96 and the color data database 98, so that the device selects the emotion value which is the closest to the emotional state.

Figure 12:
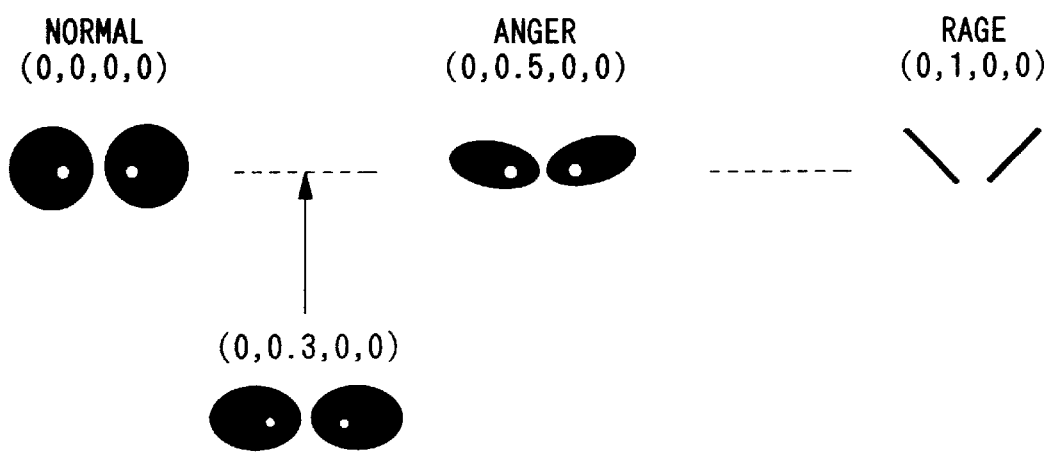
FIG. 12 shows an example of a method to determine a facial feature in accordance with the feature determination engine.

FIG. 12 shows an example of a method of determination of features of a face, which is one example of the feature determination method. Specifically, FIG. 12 shows variations of a facial feature of eyes. The emotion value Di corresponds to any one of points on the emotion map, so the device is subjected to learning with respect to major points on the emotion map, i.e., ordinal variations of emotions which can be observed from the user. Herein, feature data of the face are provided in advance with respect to the major points, while intermediate features, which complement the major points, are output with respect to points other than the major points. In the case of the eyes, for example, there are provided three kinds of major points, i.e., "normal" (0, 0, 0, 0), "anger" (0, 0.5, 0, 0) and "rage" (0, 1, 0, 0). At occurrence of an intermediate point, the device creates data suited to an emotion of "slight anger" (0, 0.3, 0, 0), for example.

Figure 13:
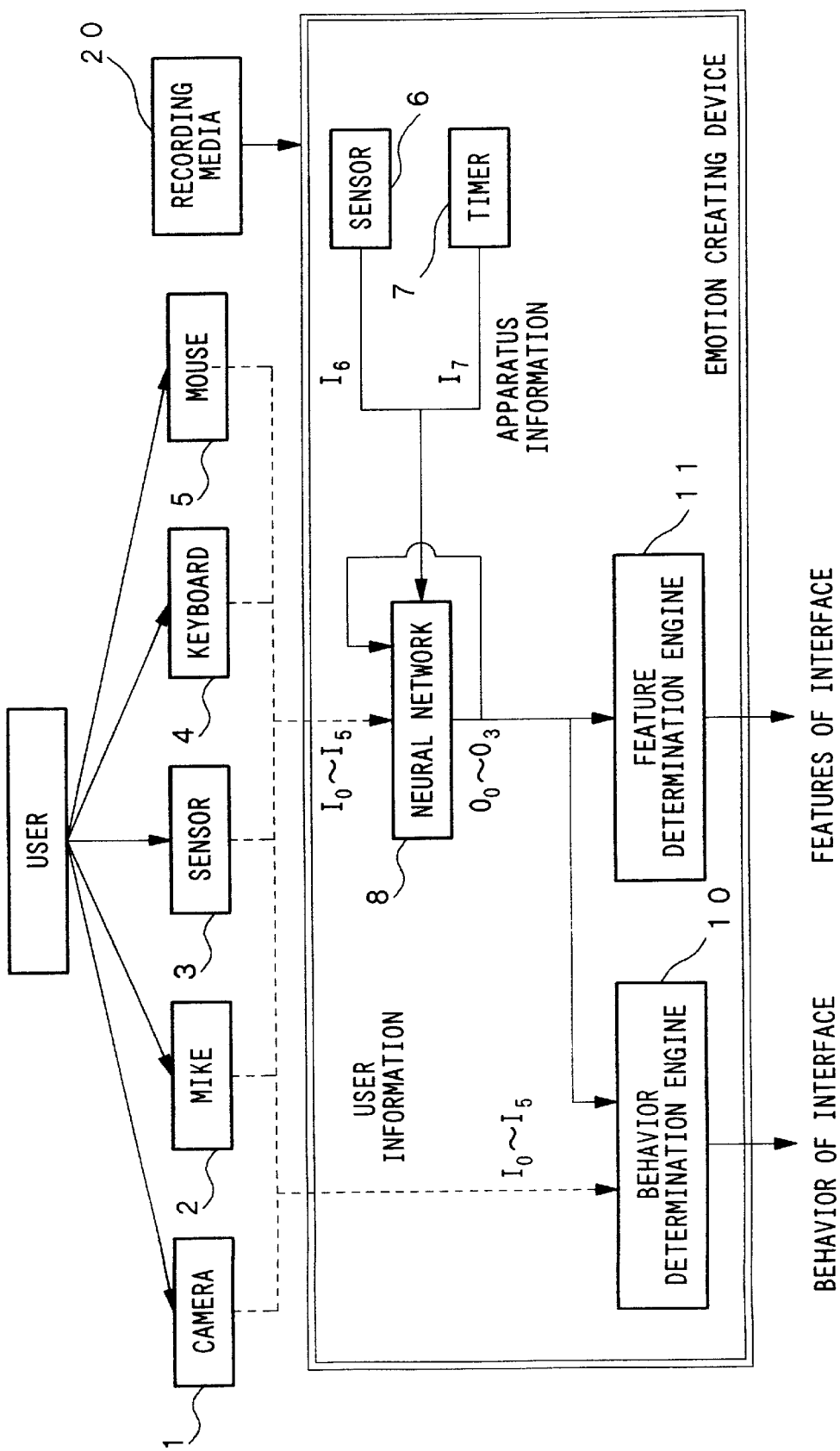
FIG. 13 is a block diagram showing a modified example of the emotion creating device.

FIG. 13 is a block diagram showing a configuration of the emotion creating device in accordance with a modified example of the preferred embodiment of the invention, wherein parts equivalent to those shown in FIG. 1 are designated by the same numerals. As compared with the aforementioned example of the emotion creating device shown in FIG. 1, the modified example of the emotion creating device of FIG. 13 is characterized by providing a recording media 20 which stores an emotion creating program (including data) to realize an emotion creating method. As the recording media 20, it is possible to employ a magnetic disk, a semiconductor memory and other types of memories. A computer (not shown) loads the emotion creating program from the recording media 20. So, the operation of the computer is controlled to actualize functions of the emotion creating device. The operation of the emotion creating device actualized by the computer is quite identical to that of the aforementioned example of the emotion creating device; hence, the detailed description thereof will be omitted.

According the emotion creating device and its method in the modified example, the neural network 8 is subjected to learning with respect to a finite number of patterns established between combinations of user information $I_0$ to $I_5$ and apparatus information $I_6$, $I_7$ and their ideal emotional states $O_0$ to $O_3$. Thus, the neural network 8 is designed to have a capability to output the emotional states $O_0$ to $O_3$ with respect to every situation. So, it is possible to personify the behavior and features of the interface more naturally like the real biological life form.

As this invention may be embodied in several forms without departing from the spirit of essential characteristics thereof, the examples of the embodiment are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An emotion creating device, provided for an interface of information between a user and an electronic apparatus, comprising:
    a neural network for inputting user information, apparatus information and a present set of emotional states so as to output a next set of emotional states;
    a behavior determination engine for inputting the user information and the emotional states of the neural network so as to determine a behavior of an interface; and
    a feature determination engine for inputting the emotional states of the neural network to determine a feature of the interface.

2. An emotion creating device as defined in claim 1 wherein the user information corresponds to a number of times of blinking detected by a camera, loudness of voice and a voice interval detected by a mike, a pulse rate detected by a sensor, an intensity of key depression given from a keyboard and a using time given from a mouse, while the apparatus information corresponds to an internal temperature detected by the sensor and a using time measured by a timer, so that the neural network outputs the emotional states which correspond to pleasure, anger, sadness and surprise.

3. An emotion creating device as defined in claim 1 wherein the behavior determination engine comprises input detection information processing means for detecting the user information, which corresponds to a number of times of blinking detected by a camera, loudness of voice and a voice interval detected by a mike, a pulse rate detected by a sensor, an intensity of key depression given from a keyboard and a using time given from a mouse, to output processed information, a behavior determination database having a table representing correspondence between the processed information, the emotional states and the behavior of the interface, and behavior determination means for performing searching on the behavior determination database by inputting the processed information from the input detection information processing means as well as the emotional states of the neural network which correspond to emotions of pleasure, anger, sadness and surprise, thus determining the behavior of the interface.

4. An emotion creating device as defined in claim 1 wherein the feature determination engine comprises an eye data database for storing eye data, eye data production means for referring to the eye data database to produce the eye data corresponding to the emotional states of the neural network, a nose data database for storing nose data, nose data production means for referring to the nose data database to produce the nose data corresponding to the emotional states of the neural network, a mouth data database for storing mouth data, mouth data production means for referring to the mouth data database to produce the mouth data corresponding to the emotional states of the neural network, a color data database for storing color data, color data production means for referring to the color data database to produce the color data corresponding to the emotional states of the neural network, and feature data production means for producing the features of the interface based on the eye data, the nose data, the mouth data and the color data which are produced by the eye data production means, the nose data production means, the mouth data production means and the color data production means respectively.

5. A machine-readable recording media storing a program which causes a computer to perform an emotion creating method comprising:

actualizing a neural network for inputting user information, apparatus information and a present set of emotional states to output a next set of emotional states;

actualizing a behavior determination engine for inputting the user information and the emotional states of the neural network to determine a behavior of an interface; and actualizing a feature determination engine for inputting the emotional states of the neural network to determine features of the interface.

6. An emotion creating device comprising:

a neural network for inputting user information representing conditions of a user and apparatus information representing conditions of an electronic apparatus so as to produce emotional states corresponding to prescribed emotions, wherein the neural network producing a present set of emotional states in consideration of a previous set of emotional states;

a behavior determination engine for referring to a behavior determination database using the user information and the emotional states of the neural network so as to determine a behavior of an interface; and a feature determination engine for referring to a database using the emotional states of the neural network so as to determine a feature of the interface.

7. An emotion creating device as defined in claim 6 wherein the conditions of the user correspond to a number of times of blinking, loudness of voice, a voice interval, a pulse rate, an intensity of key depression and a first using time that the user accesses the electronic apparatus, while the conditions of the electronic apparatus correspond to an internal temperature and a second using time that the electronic apparatus is used.

8. An emotion creating device as defined in claim 6 wherein the prescribed emotions correspond to pleasure, anger, sadness and surprise respectively.

9. An emotion creating device as defined in claim 6 wherein the interface corresponds to an artificial agent or a personified agent.

10. An emotion creating device as defined in claim 6 wherein the emotional states of the neural network are represented using coordinate values on a four-dimensional coordinate system whose axes respectively correspond to intensities of the prescribed emotions.

11. An emotion creating device as defined in claim 6 wherein the feature of the interface correspond to a facial feature.

* * * * *